US009903408B2

(12) United States Patent
Liao

(10) Patent No.: US 9,903,408 B2
(45) Date of Patent: Feb. 27, 2018

(54) FAST-DISMOUNTED CYMBAL-LOCKING NUT

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 84 days.

(21) Appl. No.: 15/222,139

(22) Filed: Jul. 28, 2016

(65) Prior Publication Data

US 2018/0031025 A1 Feb. 1, 2018

(51) Int. Cl.
*F16B 37/16* (2006.01)
*F16B 37/08* (2006.01)
*G10D 13/06* (2006.01)
*G10D 13/02* (2006.01)

(52) U.S. Cl.
CPC ....... *F16B 37/0821* (2013.01); *G10D 13/026* (2013.01); *G10D 13/06* (2013.01); *F16B 37/16* (2013.01)

(58) Field of Classification Search
CPC .............. F16B 37/0821; F16B 37/0828; F16B 37/0885; F16B 37/0892; F16B 37/16; G10D 13/026; G10D 13/06
USPC ........ 411/432–433, 435–436, 437; 84/411 R
See application file for complete search history.

(56) References Cited

U.S. PATENT DOCUMENTS 3,721,506 A * 3/1973 Anderson ............. F01D 5/3038 416/215
4,462,731 A * 7/1984 Rovinsky ............ F16B 37/0892 269/173
6,259,011 B1 * 7/2001 Liao ....................... G10D 13/06 84/327
6,274,797 B1 * 8/2001 Liao ....................... G10D 13/06 84/327
6,417,434 B1 * 7/2002 Lao ........................ G10D 13/06 84/422.1
6,858,788 B2 * 2/2005 Liao ....................... G10D 13/06 84/327
7,560,633 B1 * 7/2009 Wang .................. G10D 13/026 84/421
8,269,088 B1 * 9/2012 Liao ....................... G10D 13/06 84/421
8,288,639 B2 * 10/2012 Carraro .................. G10D 13/06 84/421
8,865,988 B2 * 10/2014 Nakata .................. G10G 5/005 84/422.3

* cited by examiner

*Primary Examiner* — Roberta S Delisle
(74) *Attorney, Agent, or Firm* — Muncy, Geissler, Olds & Lowe, P.C.

(57) ABSTRACT

A fast-dismounted cymbal-locking nut being screwed through an outer thread of a mounting bolt of a cymbal to press the cymbal tightly and adjust the position of the cymbal, comprises a seat, a first wing, a second wing, and a resilience element. The first and second wings are pivotally coupled to the seat; each of them has a locking position and a fast-dismount position. The first and second wings respectively include first and second semi-spherical threaded grooves, which jointly form an inner thread corresponding to the outer thread at their locking positions. At the fast-dismount positions, the shortest distance between the first and second semi-spherical threaded grooves is larger than the outer diameter of the outer thread. The user can directly mount the nut to the outer thread without screwing the nut through the outer thread. The nut enables the user to fast mount or dismount a cymbal.

7 Claims, 8 Drawing Sheets

FAST-DISMOUNTED CYMBAL-LOCKING NUT

FIELD OF THE INVENTION

The present invention relates to a cymbal locking technology, particularly to a fast-dismounted cymbal-locking nut.

BACKGROUND OF THE INVENTION

Refer to FIG. 1 for a conventional fast-dismounted cymbal-locking nut assembly. The nut assembly comprises a mounting bolt 1 disposed on the top of a cymbal stand 5. Two damping felts 2 are inserted through the mounting bolt 1. A cymbal 3 is clamped by the two damping felts 2. A locking head 4 is screwed through the mounting bolt 1 to fasten the damping felts 2, whereby the damping felts 2 grip the cymbal 3 securely.

Although the abovementioned structure enables the cymbal 3 to work, the user has to slowly rotate the locking head 4 many cycles to mount or dismount the cymbal 3. Therefore, the operation of the abovementioned structure is very laborious and time-consuming.

Refer to FIG. 2 and FIG. 3 for another conventional technology. The conventional structure comprises a fast nut 6, a fast screw plate 7, an altitude adjusting ring 8 and a compression element 9. While the fast screw plate 7 is aligned parallel to the fast nut 6, the cymbal 3 and the felts 2 can be inserted through the mounting bolt 1. While the fast screw plate 7 is aligned non-parallel to the fast nut 6, the cymbal 3 and the felts 2 are blocked from leaving the mounting bolt 1. The altitude adjusting ring 8 is rotated to rise along the mounting bolt 1, whereby the compression element 9 is pushed upward to compress the felts 2. The conventional structure enables the user to mount or dismount the cymbal 3 without screwing the locking head. However, the altitude adjusting ring 8 is below the cymbal 3, and the cymbal 3 will hinder the user from operating the altitude adjusting ring 8. Therefore, the user is inconvenient to operate the altitude adjusting ring 8 and adjust the altitude of the cymbal 3.

SUMMARY OF THE INVENTION

The primary objective of the present invention is to provide a fast-dismounted cymbal-locking nut to meet the requirement of fast-mounting/dismounting a cymbal.

In order to achieve the abovementioned objective, the present invention proposes a fast-dismounted cymbal-locking nut, which is to be screwed through an outer thread of a mounting bolt of a cymbal to press the cymbal tightly and adjust the position of the cymbal, and which comprises a seat, a first wing, a second wing, and a resilience element. The first wing is pivotally coupled to the seat, having a locking position and a fast-dismount position and including a first semi-spherical threaded groove. The second wing is pivotally coupled to the seat, having a locking position and a fast-dismount position and including a second semi-spherical threaded groove. While the first wing and the second wing are respectively at their locking positions, the first semi-spherical threaded groove and the second semi-spherical threaded groove are docked to jointly form an inner thread corresponding to the outer thread. While the first wing and the second wing are respectively at their fast-dismount positions, the shortest distance between the first semi-spherical threaded groove and the second semi-spherical threaded groove is larger than the outer diameter of the outer thread. The resilience element is used to force the first wing and the second wing to respectively move from their fast-dismount positions toward their locking positions and maintain the first wing and the second wing to be normally at their locking positions.

As mentioned above, while the first wing and the second wing are respectively at their fast-dismount positions, the shortest distance between the first semi-spherical threaded groove and the second semi-spherical threaded groove is larger than the outer diameter of the outer thread. Thus, the user can directly mount the fast-dismounted cymbal-locking nut the mounting bolt and reach the locking state or directly dismount the fast-dismounted cymbal-locking nut off the mounting bolt from the locking state without screwing the nut through the outer thread of the mounting bolt slowly and laboriously. Therefore, the fast-dismounted cymbal-locking nut of the present invention enables the user to fast mount or dismount a cymbal. While the first wing and the second wing are respectively at their locking positions, the first semi-spherical threaded groove and the second semi-spherical threaded groove are docked to jointly form the inner thread corresponding to the outer thread. Thus, the user can screw the fast-dismounted cymbal-locking nut of the present invention through the outer thread to press the cymbal and secure the cymbal tightly.

DETAILED DESCRIPTION OF THE PREFERRED EMBODIMENTS

Figure 1:
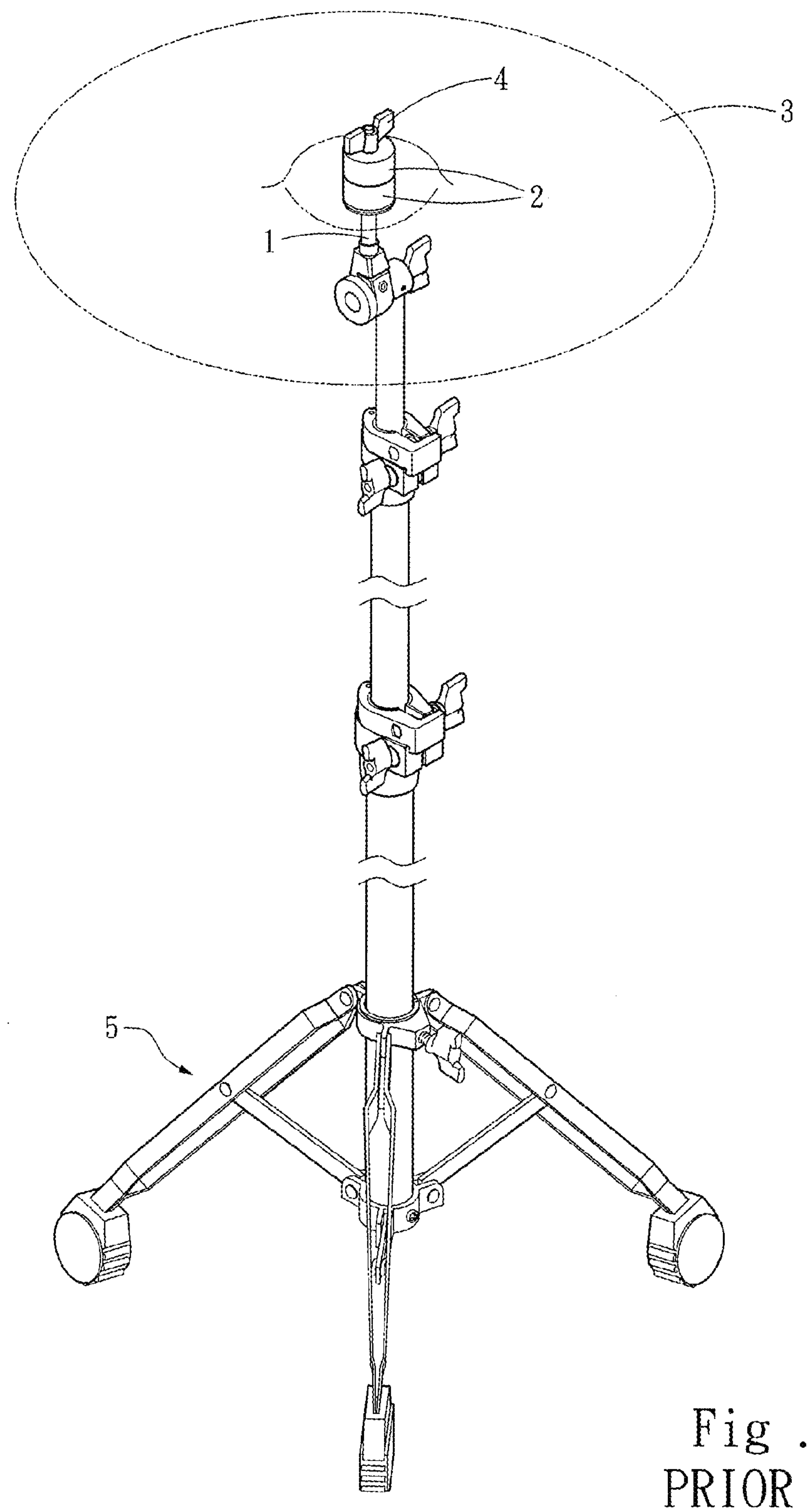
FIG. 1 is a diagram schematically showing a conventional cymbal-locking structure.
Figure 2:
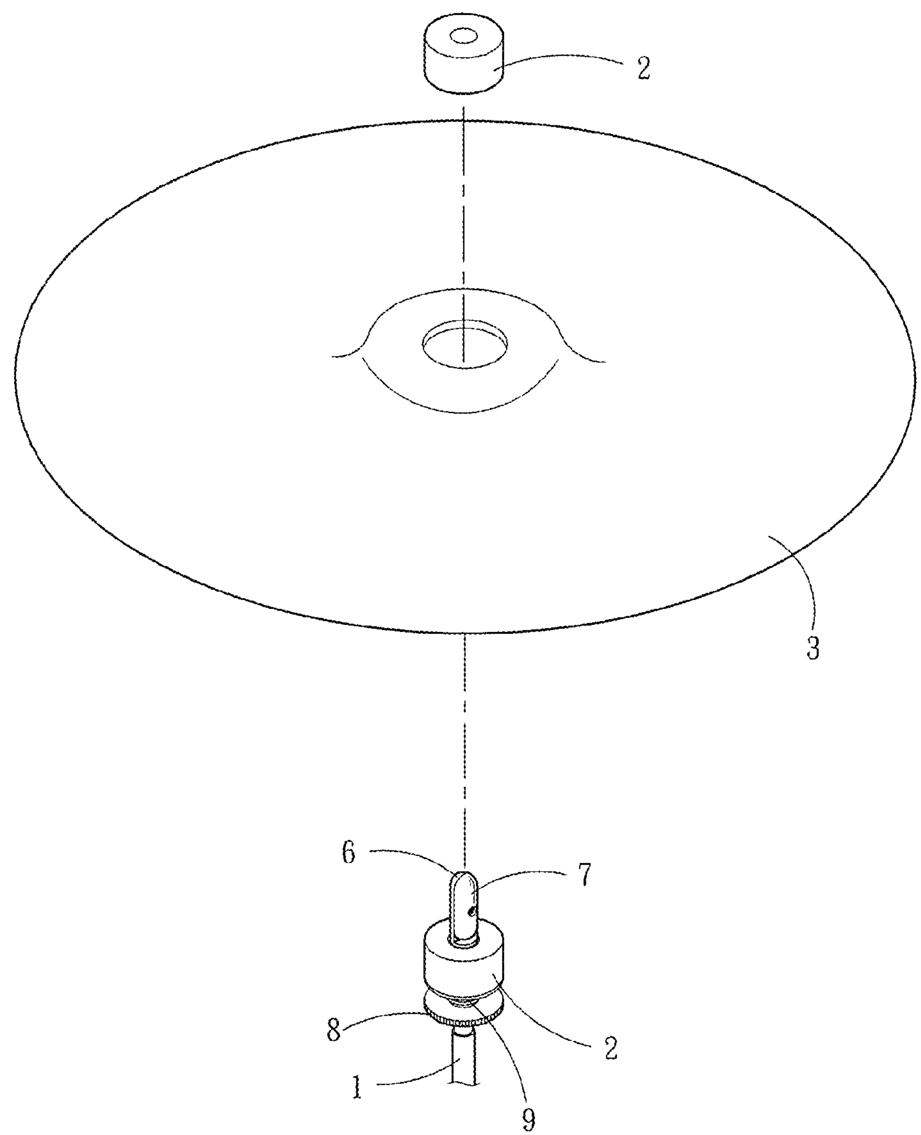
FIG. 2 is a first diagram schematically showing another conventional cymbal-locking structure.
Figure 3:
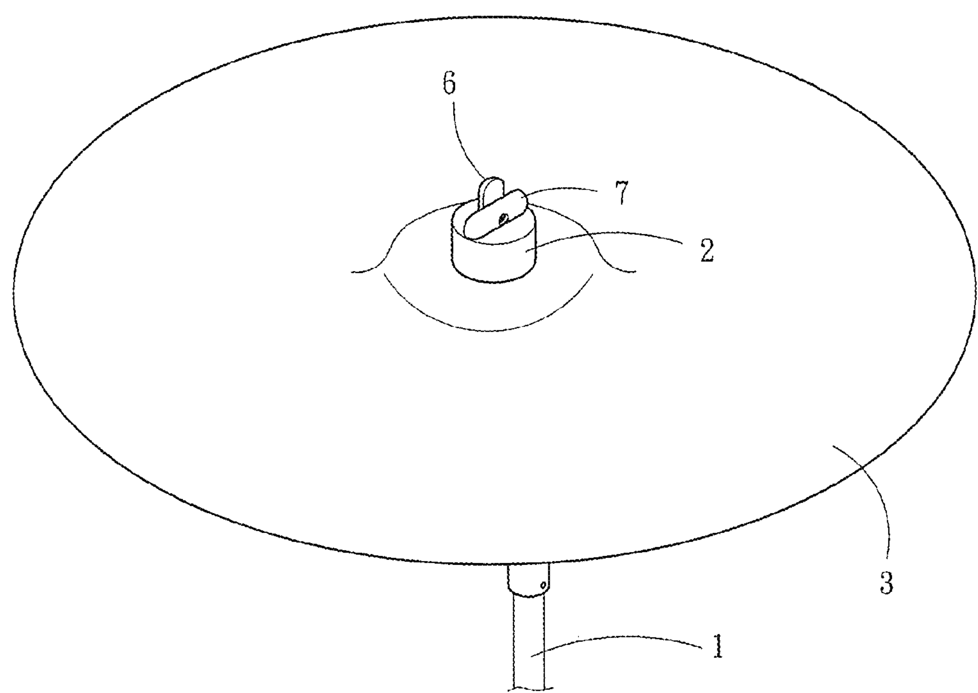
FIG. 3 is a second diagram schematically showing the abovementioned another conventional cymbal-locking structure.
Figure 4:
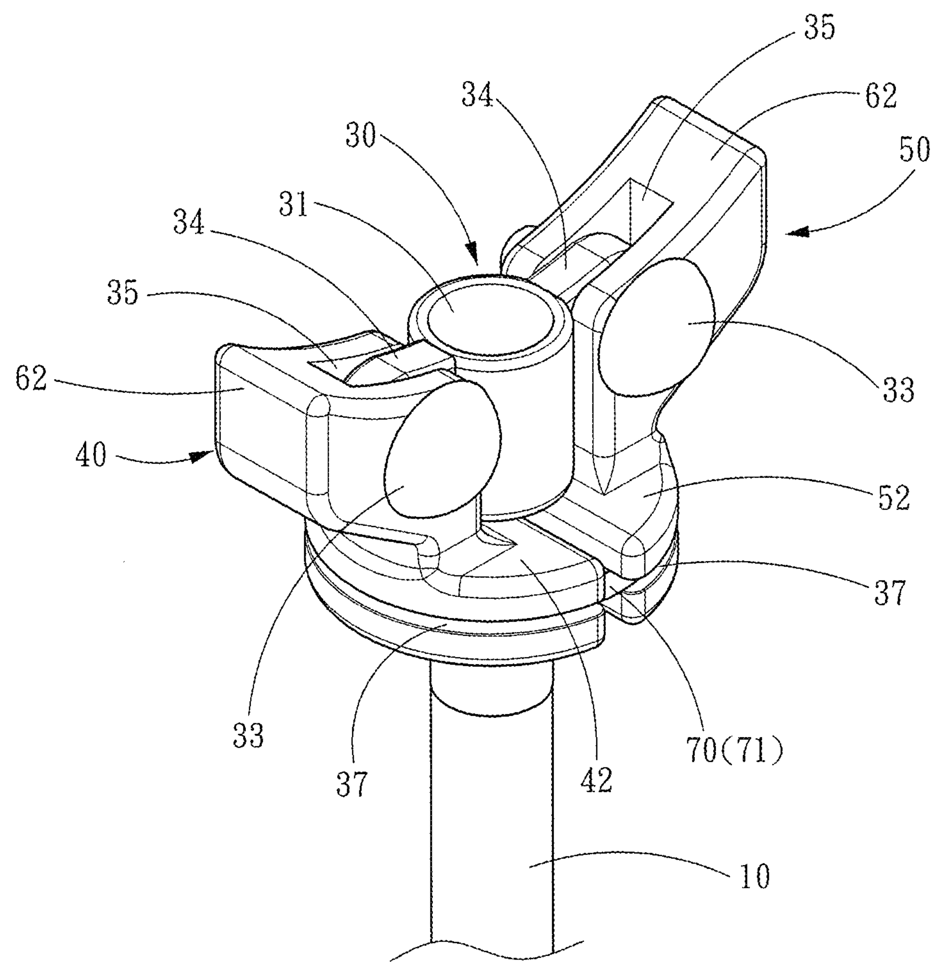
FIG. 4 is a perspective view schematically showing the structure of a fast-dismounted cymbal-locking nut according to one embodiment of the present invention.
Figure 5:
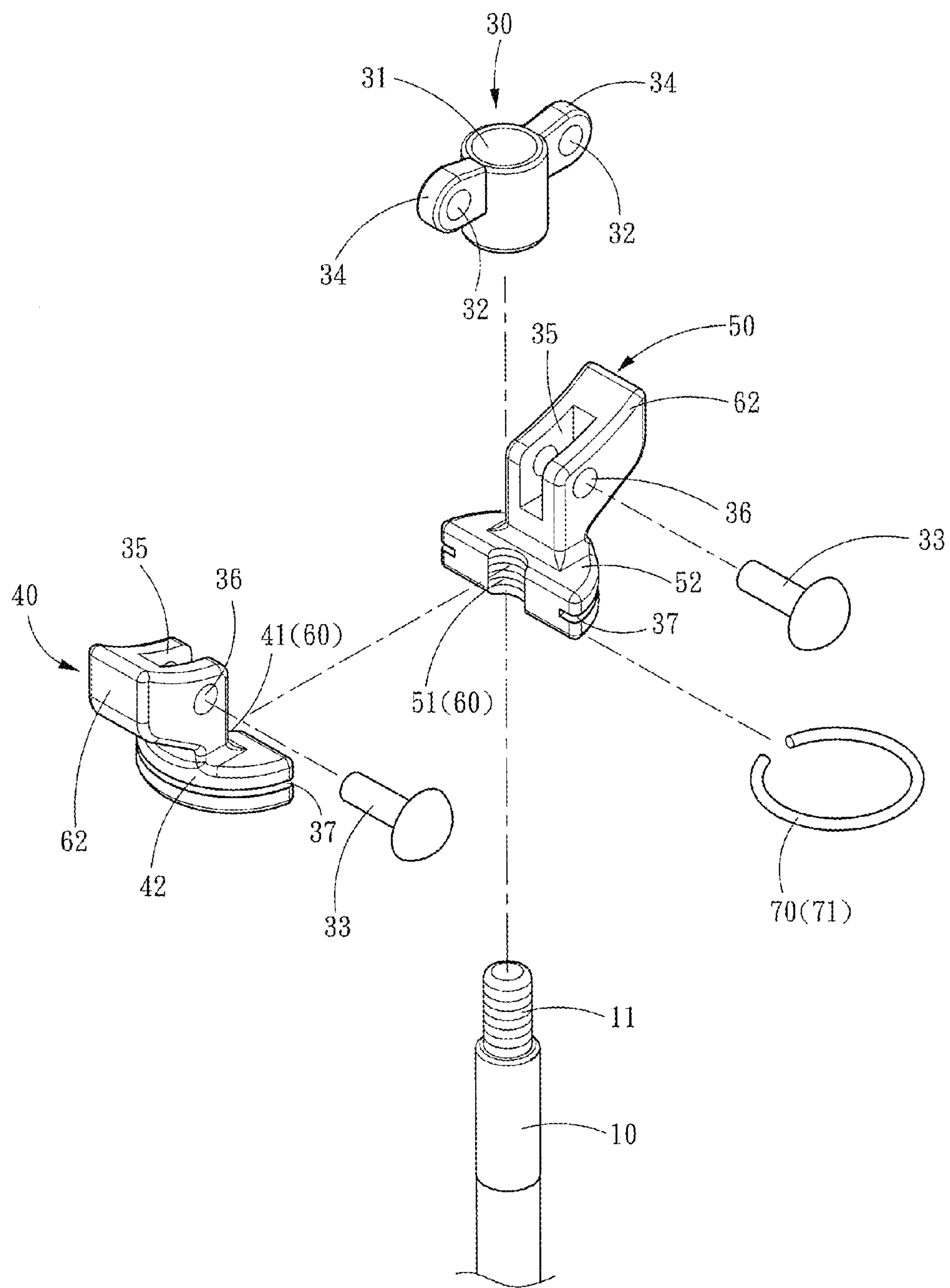
FIG. 5 is an exploded view schematically showing the structure of a fast-dismounted cymbal-locking nut according to one embodiment of the present invention.
Figure 6:
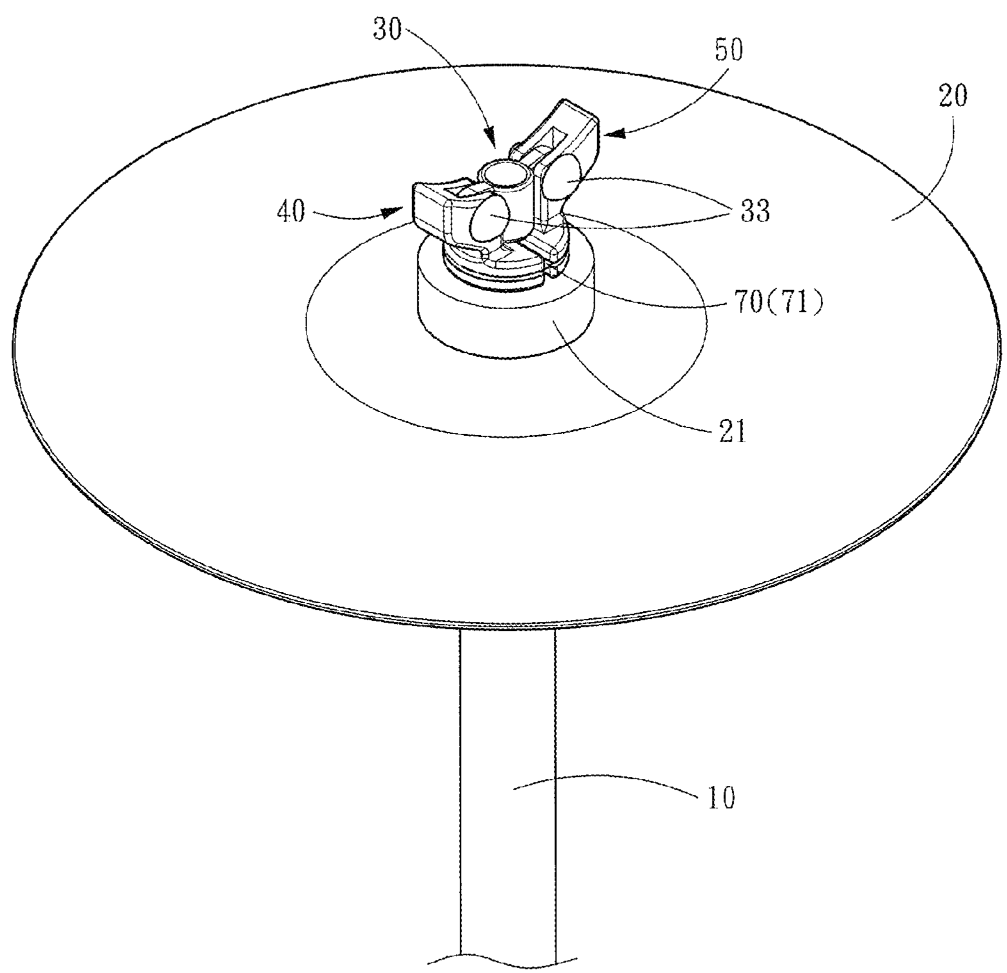
FIG. 6 is a perspective view schematically showing the structure of a fast-dismounted cymbal-locking nut that locks a cymbal according to one embodiment of the present invention.

The technical contents, characteristics and efficacies of the present invention will be described with embodiments and drawings below.

Refer to FIGS. 4-6, FIG. 7A and FIG. 7B. The present invention proposes a fast-dismounted cymbal-locking nut, which is to be screwed through an outer thread 11 of a mounting bolt 10 of a cymbal 20 to press the cymbal 20 tightly and adjust the position of the cymbal 20, and which comprises a seat 30, a first wing 40, a second wing 50, and a resilience element 70. The first wing 40 is pivotally coupled to the seat 30 and has a locking position and a fast-dismount position. The second wing 50 is also pivotally coupled to the seat 30 and also has a locking position and a fast-dismount position.

The seat 30 includes a hollow pipe 31 allowing the mounting bolt 10 to pass through. The hollow pipe 31 includes two pivotal holes 32 respectively on two lateral sides thereof. The first wing 40 and the second wing 50 are respectively pivotally coupled to the two pivotal holes 32 by two rivets 33. The pivotal holes 32 are respectively formed on two side fins 34 on two lateral sides of the hollow pipe 31. Each of the first wing 40 and the second wing 50 includes a slot 35 for receiving the side fin 34. Each slot 35 includes an insert hole 36 allowing the rivet 33 to pass through.

The first wing 40 includes a first semi-spherical threaded groove 41, and the second wing 50 includes a second semi-spherical threaded groove 51. While the first wing 40 and the second wing 50 are respectively at their locking positions, the first semi-spherical threaded groove 41 and the second semi-spherical threaded groove 51 are docked to jointly form an inner thread 60 corresponding to the outer thread 11 (shown in FIG. 7A). While the first wing 40 and the second wing 50 are respectively at their fast-dismount positions, the shortest distance between the first semi-spherical threaded groove 41 and the second semi-spherical threaded groove 51 is larger than the outer diameter of the outer thread 11. In one embodiment, the first wing 40 includes a first half column 42 where the first semi-spherical threaded groove 41 is formed; the second wing 50 includes a second half column 52 where the second semi-spherical threaded groove 51 is formed. While the first half column 42 and the second half column 52 are respectively at their locking positions, the bottoms of the first half column 42 and the second half column 52 jointly form a pressing face 61 (as shown in FIG. 7A).

The resilience element 70 is used to force the first wing 40 and the second wing 50 to respectively move from their fast-dismount positions toward their locking positions. The resilience element 70 may be realized in various ways, such as in an elastic element. In one embodiment, the resilience element 70 is a C-type clip ring 71. While the C-type clip ring 71 annularly grips the first half column 42 and the second half column 52, the first wing 40 and the second wing 50 are normally at their locking positions. In order to prevent the C-type clip ring 71 from dropping, the first half column 42 and the second half column 52 respectively include snap-fit grooves 37 for receiving the C-type clip ring 71. In order to convenience the user to operate, two pressing members 62 are respectively formed on two sides of the first wing 40 and the second wing 50, which are far away from the C-type clip ring 71, whereby the user can conveniently compress the two pressing members 62 simultaneously to counteract the annular gripping force of the C-type clip ring 71 and shift the first wing 40 and the second wing 50 from the locking positions to the fast-dismount positions.

Figure 7A:
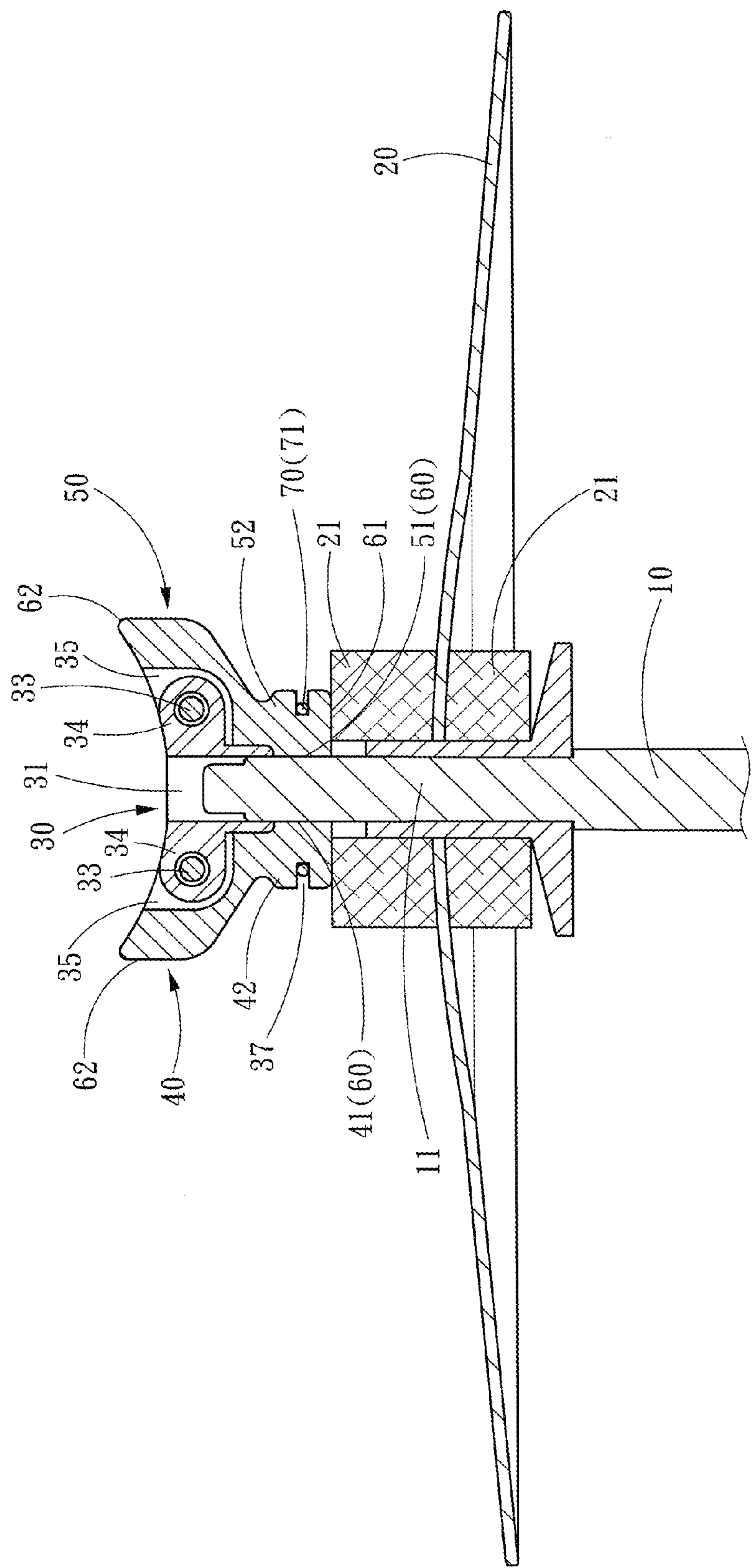
FIG. 7A is a sectional view schematically showing a fast-dismounted cymbal-locking nut in a locking state according to one embodiment of the present invention.
Figure 7B:
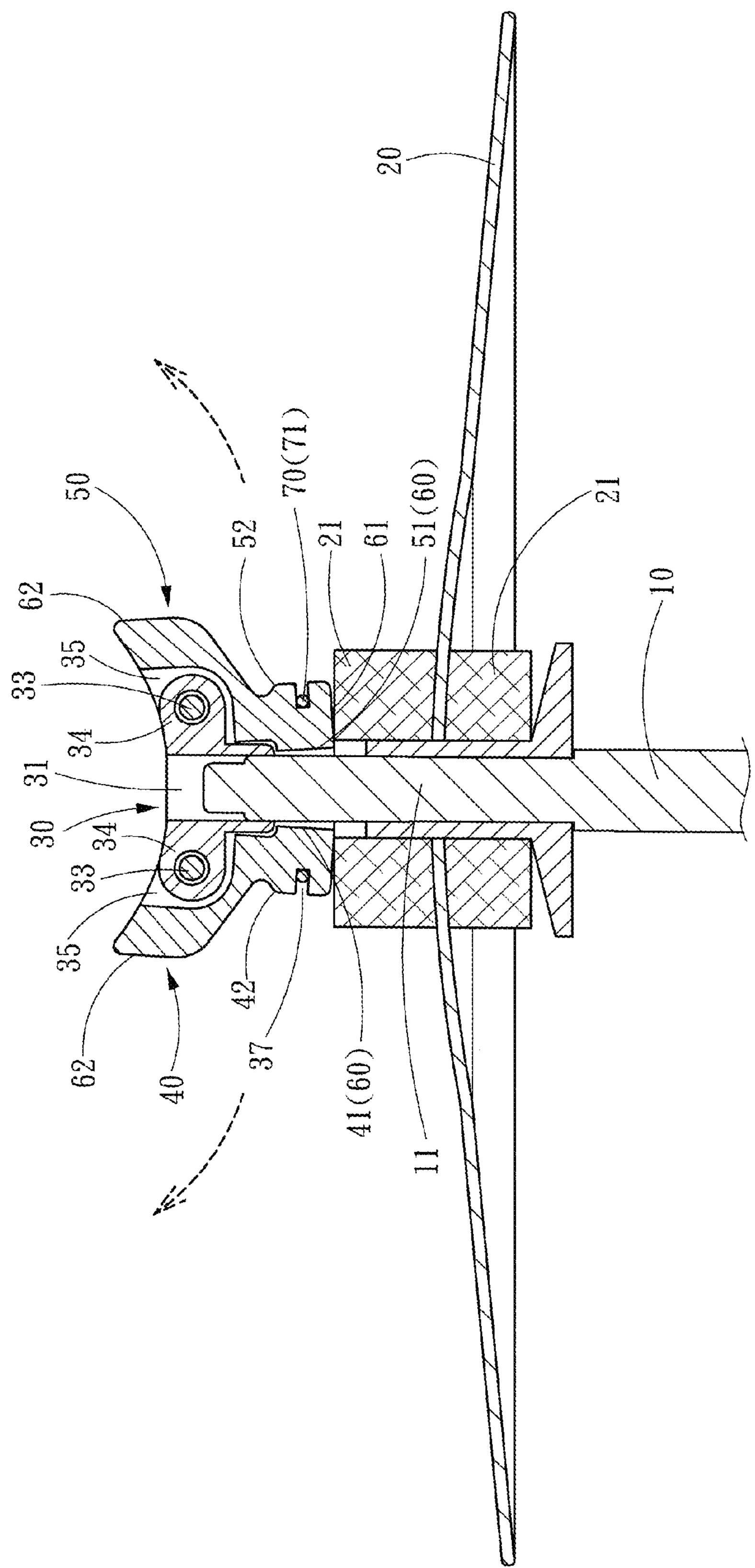
FIG. 7B is a sectional view schematically showing a fast-dismounted cymbal-locking nut in a fast-dismount state according to one embodiment of the present invention.

Refer to FIG. 7A and FIG. 7B again. In the normal state, the first wing 40 and the second wing 50 are at the locking positions, and the first semi-spherical threaded groove 41 and the second semi-spherical threaded groove 51 are docked to jointly form the inner thread 60 (as shown in FIG. 7A). Thus, the fast-dismounted cymbal-locking nut of the present invention can be screwed along the outer thread 11 to compress the cymbal 20 and secure the cymbal 20 tightly. While the first wing 40 and the second wing 50 are compressed to be at the fast-dismount positions (as shown in FIG. 7B), and the shortest distance between the first semi-spherical threaded groove 41 and the second semi-spherical threaded groove 51 is larger than the outer diameter of the outer thread 11. Thus, the user can directly mount the fast-dismounted cymbal-locking nut_to the mounting bolt 10 and reach the locking state or directly dismount the fast-dismounted cymbal-locking nut off the mounting bolt 10 from the locking state without screwing the nut through the outer thread 11 of the mounting bolt 10. Therefore, the fast-dismounted cymbal-locking nut of the present invention enables the user to fast mount or dismount a cymbal.

What is claimed is:

1. A fast-dismounted cymbal-locking nut, which is to be screwed through an outer thread of a mounting bolt of a cymbal to press the cymbal tightly and adjust the position of the cymbal, and which comprises a seat;

a first wing, pivotally coupled to the seat, having a locking position and a fast-dismount position, and including a first semi-spherical threaded groove;

a second wing, pivotally coupled to the seat, having a locking position and a fast-dismount position, and including a second semi-spherical threaded groove, wherein while the first wing and the second wing are respectively at their locking positions, the first semi-spherical threaded groove and the second semi-spherical threaded groove are docked to jointly form an inner thread corresponding to the outer thread, and wherein while the first wing and the second wing are respectively at their fast-dismount positions, the shortest distance between the first semi-spherical threaded groove and the second semi-spherical threaded groove is larger than the outer diameter of the outer thread; and a resilience element, forcing the first wing and the second wing to respectively move from their fast-dismount positions toward their locking positions.

2. The fast-dismounted cymbal-locking nut according to claim 1, wherein the seat includes a hollow pipe allowing the mounting bolt to pass through, and wherein the hollow pipe includes two pivotal holes respectively on two lateral sides thereof, and wherein the first wing and the second wing are respectively pivotally coupled to the two pivotal holes by two rivets.

3. The fast-dismounted cymbal-locking nut according to claim 2, wherein the pivotal holes are respectively formed on two side fins on two lateral sides of the hollow pipe, and wherein each of the first wing and the second wing includes a slot for receiving the side fin, and wherein each slot includes an insert hole allowing the rivet to pass through.

4. The fast-dismounted cymbal-locking nut according to claim 1, wherein the first wing includes a first half column where the first semi-spherical threaded groove is formed, and the second wing includes a second half column where the second semi-spherical threaded groove is formed, and wherein while the first half column and the second half column are respectively at the locking positions, the bottoms of the first half column and the second half column jointly form a pressing face.

5. The fast-dismounted cymbal-locking nut according to claim 4, wherein the resilience element is a C-type clip ring annularly gripping the first half column and the second half column.

6. The fast-dismounted cymbal-locking nut according to claim 5, wherein the first half column and the second half column respectively include snap-fit grooves for receiving the C-type clip ring.

7. The fast-dismounted cymbal-locking nut according to claim 5, wherein two pressing members are respectively formed on two sides of the first wing and the second wing, which are far away from the C-type clip ring.

* * * * *